(12) United States Patent
Ho et al.

(10) Patent No.: US 8,702,878 B2
(45) Date of Patent: Apr. 22, 2014

(54) METHOD FOR CONTROLLING BETA-TIN ORIENTATION IN SOLDER JOINTS

(75) Inventors: Cheng-En Ho, New Taipei (TW); Bo-Zong Chen, Tainan (TW); Chih-Nan Chen, Taoyuan County (TW)

(73) Assignee: Yuan Ze University, Taoyuan County (TW)

( * ) Notice: Subject to any disclaimer, the term of this patent is extended or adjusted under 35 U.S.C. 154(b) by 344 days.

(21) Appl. No.: 13/182,432

(22) Filed: Jul. 13, 2011

(65) Prior Publication Data

US 2013/0008288 A1 Jan. 10, 2013

(30) Foreign Application Priority Data

Jul. 6, 2011 (TW) .............................. 100123896 A

(51) Int. Cl.
*B23K 35/28* (2006.01)

(52) U.S. Cl.
USPC ........................................................ 148/528

(58) Field of Classification Search
USPC ......................................................... 148/528
See application file for complete search history.

(56) References Cited

U.S. PATENT DOCUMENTS

2009/0297879 A1* 12/2009 Zeng et al. .................... 428/647

* cited by examiner

*Primary Examiner* — Jessee Roe
(74) *Attorney, Agent, or Firm* — Jianq Chyun IP Office

(57) ABSTRACT

A method for controlling the beta-tin crystal orientation in solder joints is provided. The method is suitable for joining metallization pads using a solder containing tin and silver. By adjusting the silver content in the solder within a specific range of equal to or more than 2.5 wt. % and less than 3.2 wt. %, the [001] axes of beta-tin crystals in the solder is aligned to be in the direction parallel with a solder/metallization pad interface substantially. Electromigration-induced solder deformations and metallization pad consumption can be significantly reduced when solder joints have such a microstructure. Additionally, the undesired $Ag_3Sn$ plates in the solder matrix can be avoided accordingly.

2 Claims, 5 Drawing Sheets

METHOD FOR CONTROLLING BETA-TIN ORIENTATION IN SOLDER JOINTS

This application claims the priority benefit of Taiwan application serial no. 100123896, filed Jul. 6, 2011. The entirety of the above-mentioned patent application is hereby incorporated by reference herein and made a part of this specification.

BACKGROUND OF THE INVENTION

1. Field of the Invention

The invention relates to a method for controlling the beta-tin ($\beta$-Sn) crystal orientation in solder joints, suitable for substantially enhancing the reliability of microelectronic solder joints.

2. Description of Related Art

Soldering is a process in which two or more metal items (hereafter termed metallization pads) are joined together using an alloy(s) with a relatively low melting temperature (hereafter termed solder), so as to achieve an electrical/mechanical connect between two (or more) components. The conventional solder utilized in the electronic industry is a binary or a multi-component alloy, which is composed of tin (Sn) and other minor elements. This includes a tin-lead alloy, a tin-zinc alloy, a tin-bismuth alloy, a tin-indium alloy, a tin-antimony alloy, a tin-copper alloy, a tin-silver alloy, a tin-silver-copper alloy, a tin-silver-bismuth alloy and so on. A common metallization pad is primarily made of copper (Cu) or a copper alloy.

Solder joints might carry an electric current when electronic components are used in daily life. The average current density in a solder joint is inversely proportional to the square of joint diameter, and thereby high electron current stressing is usually experienced in small solder joints. The diffusing atoms/ions in the solder joints (e.g. tin or copper) upon high electron current stressing are driven to migrate along the direction of electron flow (i.e. towards the anode side of a conducting media) because of the momentum transfer between electrons and atoms resulting from an electron wind force. This current-stress-induced material transport is generally referred as electromigration. Typical electromigration-induced damages in solder joints include: (1) rapid metallization pad consumption; (2) solder deformations, e.g. voids (or valleys) and extrusions (or hillocks). Voids might be created at the cathode end of a conducting media (e.g. metallization pad or solder) whereas extrusions are commonly observed at the alternative side (i.e. the anode end) when an electron flow is imposed to a solder joint. These deformations in a solder enable to cause short circuit or disconnection of the solder joint, resulting in malfunction of an electronic device.

In order to reduce an excessive consumption in the copper metallization pads induced by electron current stressing, a nickel or nickel phosphorous (P) surface finish is usually deposited by electroplating/electroless-plating on the copper metallization pads, to prevent copper from contacting the solder directly. This is based on the fact that nickel has a much lower consumption/dissolution rate in the solder reaction system than that of copper. Additionally, nickel is capable of slowing down the growth of the fragile intermetallic compound (IMC) (e.g. copper-tin IMCs) at the solder/metallization pad interface. However, the thickness of the nickel surface finish is limited, so that the consumption of the film is commonly observed, especially for the solder joints experiencing a long-term electron current stressing treatment. When the nickel film is exhausted completely, the underneath copper is then exposed to the solder and a rapid consumption in the copper metallization pads can still occur. The exhaustion of the copper metallization pad inevitably damages the interconnections/circuits of the electronic devices and produces many fragile IMCs in the solder joints, which seriously threatens the electrical/mechanical reliability of electronic devices.

Electromigration in solder joints can also be alleviated by adding silver into the solder. Nonetheless, the silver is realized to be a noble metal. When the solder is doped with a large amount of silver, the price of such a solder material is therefore increased. Additionally, it is stated in "Journal of Alloys and Compounds, 352, p. 226, 2003" that when the content of silver in an solder alloy is more than 3.2 wt. %, many $Ag_3Sn$ plates are easily created in the solder matrix, and deteriorate the mechanical properties of the solder.

Therefore, in order to (1) prevent metallization pads from being greatly consumed; (2) prevent the solder deformations; (3) prevent the generation of $Ag_3Sn$ plates; and (4) reduce the material/manufacturing cost, to re-assess the composition of the Ag-containing solder has become essential in the manufacture of microelectronics.

SUMMARY OF THE INVENTION

The invention is directed to a method for controlling beta-tin ($\beta$-Sn) crystal orientation in a solder joint. The method is capable of controlling the [001] axes of $\beta$-Sn crystals to be aligned in the direction parallel with the solder/metallization pad interface substantially. Solder joints having such a specific $\beta$-Sn crystal orientation can prevent the metallization pad from being greatly consumed upon electron current stressing. In addition, the invention can prevent several reliability concerns like the solder deformations and the $Ag_3Sn$ plate formation in the solder, and can reduce the material cost in the soldering process.

The invention is directed to a method for controlling $\beta$-Sn crystal orientation in a solder joint. The method is suitable for joining a metallization pad with a solder. The solder contains tin and silver. By adjusting the silver content of the solder, the [001] axes of $\beta$-Sn crystals in the solder is aligned in the direction parallel with the solder/metallization pad interface substantially, wherein the silver content in the solder is within the range of equal to or more than 2.5 wt. % and less than 3.2 wt. %.

According to the method for controlling the $\beta$-Sn crystal orientation in a solder joint in the present embodiment, the solder further contains copper or other trace elements.

According to the method for controlling the $\beta$-Sn crystal orientation in a solder joint in the present embodiment, a material of the metallization pad includes a copper-based metal or a nickel-based metal.

According to the method for controlling the $\beta$-Sn crystal orientation in a solder joint in the present embodiment, the copper content of the solder is within the range of equal to or more than 0 wt. % and less than or equal to 1.5 wt. %.

In light of the foregoing, the silver content of the solder in the invention is within the range of equal to or more than 2.5 wt. % and less than 3.2 wt. %. After the solder is joined, the [001] axes of the $\beta$-Sn crystals is controlled to be in the direction parallel with the solder/metallization pad interface. The solder joint having such a specific $\beta$-Sn crystal orientation not only can reduce the consumption of metallization pads upon electron current stressing (or electromigration), but also can alleviate the solder deformations induced by electromigration. Moreover, the solder joint can prevent the formation of the $Ag_3Sn$ plates in the solder and can reduce the material cost in the soldering process.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate embodiments and, together with the description, serve to explain the principles of the invention.

DESCRIPTION OF EMBODIMENT

The invention provides a solder having a specific content of silver. The solder adopts tin as the main body, where the content of silver is within the range of equal to or more than 2.5 wt. % and less than 3.2 wt. %.

Additionally, in another embodiment, the solder of the invention can further include copper or other trace elements. Here, the addition of copper to the solder enables to lower the molten temperature and to enhance the mechanical properties of the solder. The content of copper is within the range of equal to or more than 0 wt. % and less than or equal to 1.5 wt. %, for example. After the metallization pad is joined to the solder in the invention, a large consumption of the metallization pad caused by electromigration can be prevented effectively. Furthermore, joint reliability concurs such as the solder deformations can also be prevented. Detailed description is provided in the following. Generally, the material of the metallization pad is a copper-based or a nickel-based metal, for example. In the embodiment below, two copper metallization pads are joined using a Sn—Ag—Cu solder, wherein the silver content of in the Sn—Ag—Cu solder ranges from 0 wt. % to 4 wt. %. When the contents of silver and copper both are 0 wt. %, the solder composition is represented as pure Sn. When the content of copper is fixed at 0.5 wt. % and the content of silver is 1 wt. %, 2 wt. %, 2.5 wt. %, 3 wt. %, and 4 wt. %, the solder composition is represented as Sn1Ag0.5Cu, Sn2Ag0.5Cu, Sn2.5Ag0.5Cu, Sn3Ag0.5Cu and Sn4Ag0.5Cu, respectively. However, the invention is not limited thereto, the solder can also be joined between other metal devices.

Figure 1:
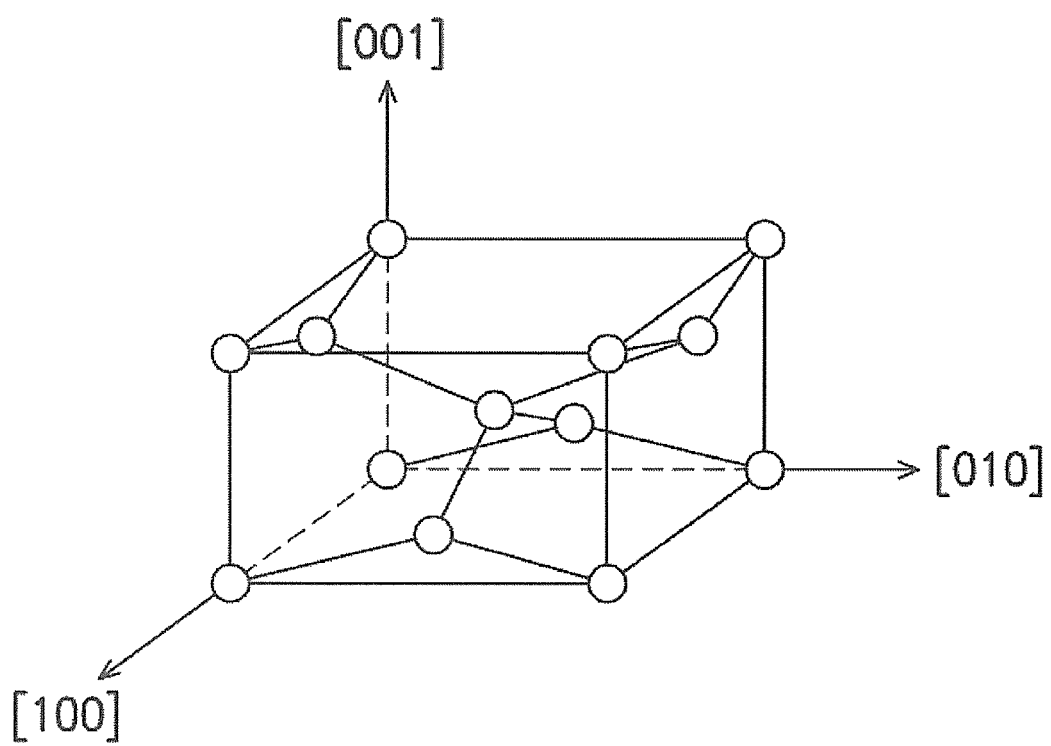
FIG. 1 shows a schematic diagram illustrating a beta-tin (β-Sn) unit cell.
Figure 2:
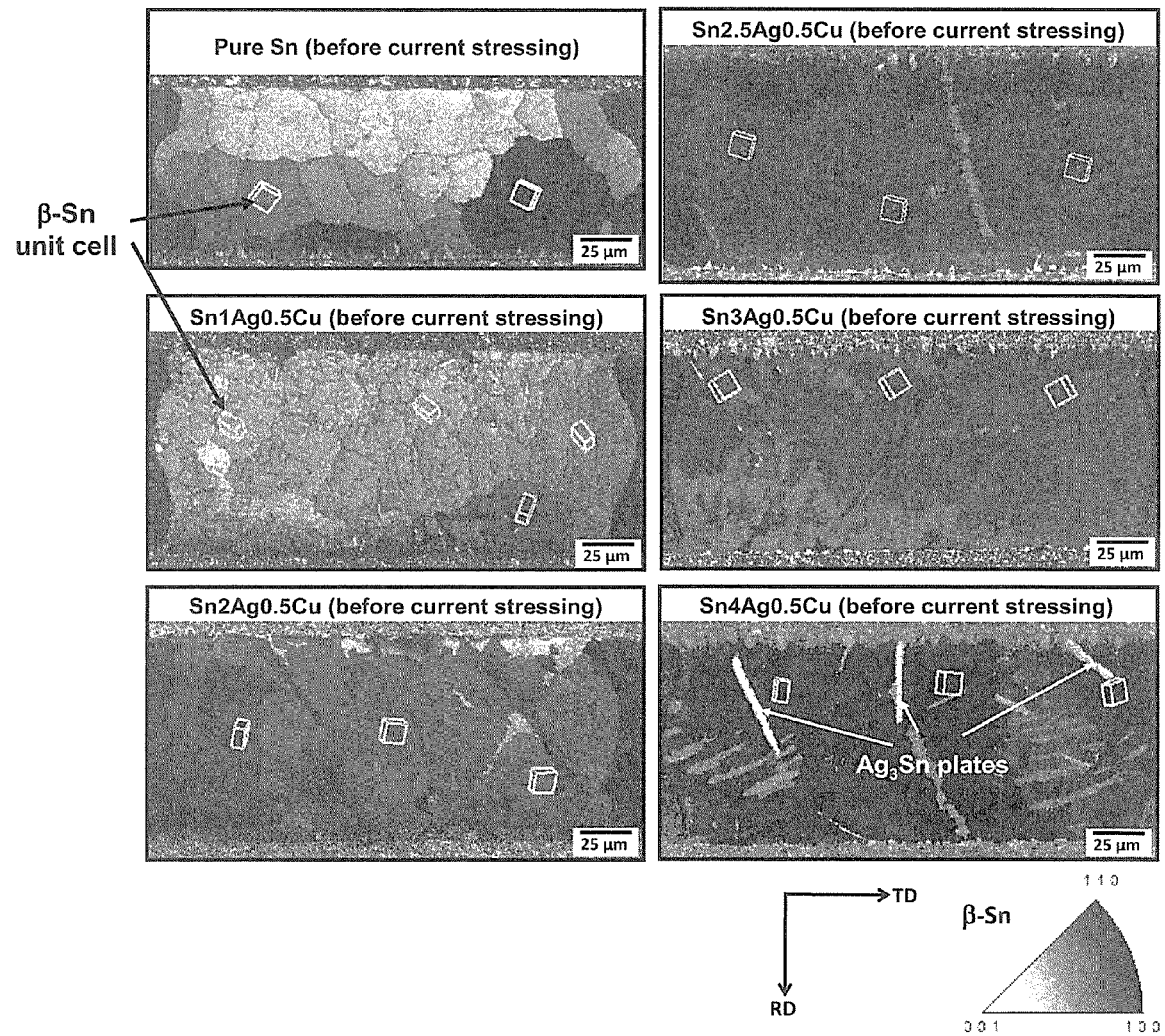
FIG. 2 shows electron backscattered diffraction (EBSD) crystal orientation maps showing correlation between β-Sn crystal orientations and the Ag content in the solder.

In a solder adopting tin as the main body, the physical/chemical properties of solder is dictated by the solid tin after soldering. Solid tin has a body center tetragonal (BCT) crystal structure at the temperature ranging from 13° C. to its melting point (about 232° C.), and is usually referred as beta-tin (β-Sn). FIG. 1 is a schematic drawing of a β-Sn unit cell. For the β-Sn crystal, the axis along its [001] direction is about 3.18 Ångström (Å) in length and the axis along the [100] or [010] directions is about 5.83 Å in length. Thus, the [001] axis of β-Sn is generally denoted as a short axis, and the [100] or [010] axis of β-Sn is referred as a long axis. FIG. 2 shows electron backscattered diffraction (EBSD) crystal orientation maps providing information about correlation between β-Sn crystal orientations and the Ag content in the solder. In this figure, the normal direction (ND), transverse direction (TD), and rolling direction (RD) refer to the direction perpendicular to the observed plane, parallel to the metallization pad/solder interface, perpendicular to the metallization pad/solder interface, respectively. Different crystal orientations of the (β-Sn crystals are indicated by various grayscale levels, as described by the sectorial legend in FIG. 2. The dark shade shown in FIG. 2 depicts the [001] axis of the β-Sn crystal tends to be in the direction parallel to the TD (or perpendicular to the RD). In contrast, if the [001] axis of the β-Sn crystal tends to be in the direction perpendicular to the TD (or parallel to the RD), the phase domain is indicated by a light shade. As shown in FIG. 2, when the solder does not contain any silver, the β-Sn crystals distribute randomly in the solder joint. With an increase of the silver content in the solder, the orientations of the β-Sn crystals reach consensus gradually. The [001] axes of the β-Sn crystals are substantially in the direction parallel to the TD (i.e. the metallization pad/solder interface) as the silver content in the solder is increased to the range of equal to or more than 2.5 wt. %. Shown in this embodiment, the β-Sn crystal orientation can be controlled by adjusting the silver content in the solder. When the content of silver is within a range of equal to or more than 2.5 wt. %, the orientations of β-Sn crystals reach consensus, wherein the [001] axes of the β-Sn crystals are substantially to be aligned in the direction parallel with the metallization pad/solder interface or TD.

However, when the silver content in the solder reaches a relatively high level (i.e. in a Sn4Ag0.5Cu solder of the embodiment), a plurality of Ag$_3$Sn plates is generated clearly in the solder. When the silver content is decreased to less than 3.2 wt. % (i.e. in a Sn3Ag0.5Cu solder of the embodiment), the number of Ag$_3$Sn plates is substantially reduced. Accordingly, by utilizing the silver content in the solder provided in the invention (that is, within the range of equal to or more than 2.5 wt. % and less than 3.2 wt. %), for soldering, the orientations of the β-Sn crystals are not only be controlled, but also the Ag$_3$Sn plates that are unfavorable for the mechanical properties of a solder joint are eliminated from the solder.

Figure 3:
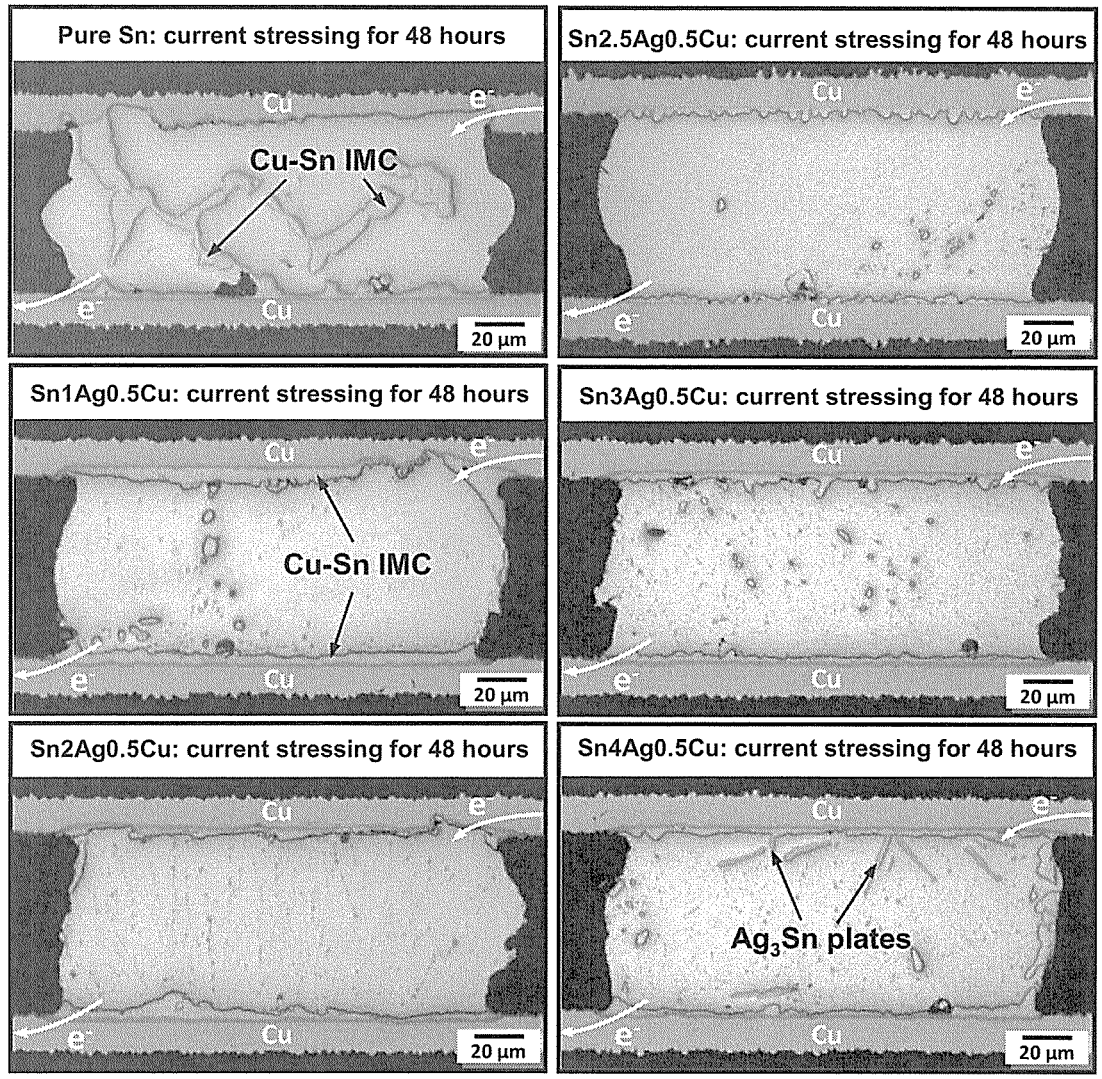
FIG. 3 shows optical microscopies of the interior microstructures for solder joints after electron current stressing for 48 hours.

FIG. 3 shows optical microscopies of the interior microstructures for solder joints after electron current stressing for 48 hours. After the copper metallization pads are joined using the solder of the invention, the [001] axes of the β-Sn crystals are controlled to be substantially in the direction parallel with the metallization pad/solder interface. Solder joints with such a β-Sn crystal orientation can prevent the copper metallization pads from being consumed greatly after electron current stressing for 48 hours, as shown in FIG. 3. Contrarily, the copper metallization pads are greatly consumed due to electron current stressing when the silver content in the solder is less than 2.5 wt %, wherein the β-Sn crystal orientations distribute randomly, and thereby the [001] axes of some β-Sn crystals are in the direction perpendicular to the metallization pad/solder interface. On the other hand, there are many undesired Ag$_3$Sn plates formed in the solder when the silver content in the solder is more than 3.2 wt. %. Accordingly, when copper metallization pads are joined to the solder of the invention (i.e. the silver content in the solder within the range of equal to or more than 2.5 wt. % and less than 3.2 wt. %), the consumption of the copper metallization pads induced by electromigration can be reduced remarkably and the unfavorable Ag$_3$Sn plates are not generated in the solder.

Figure 4:
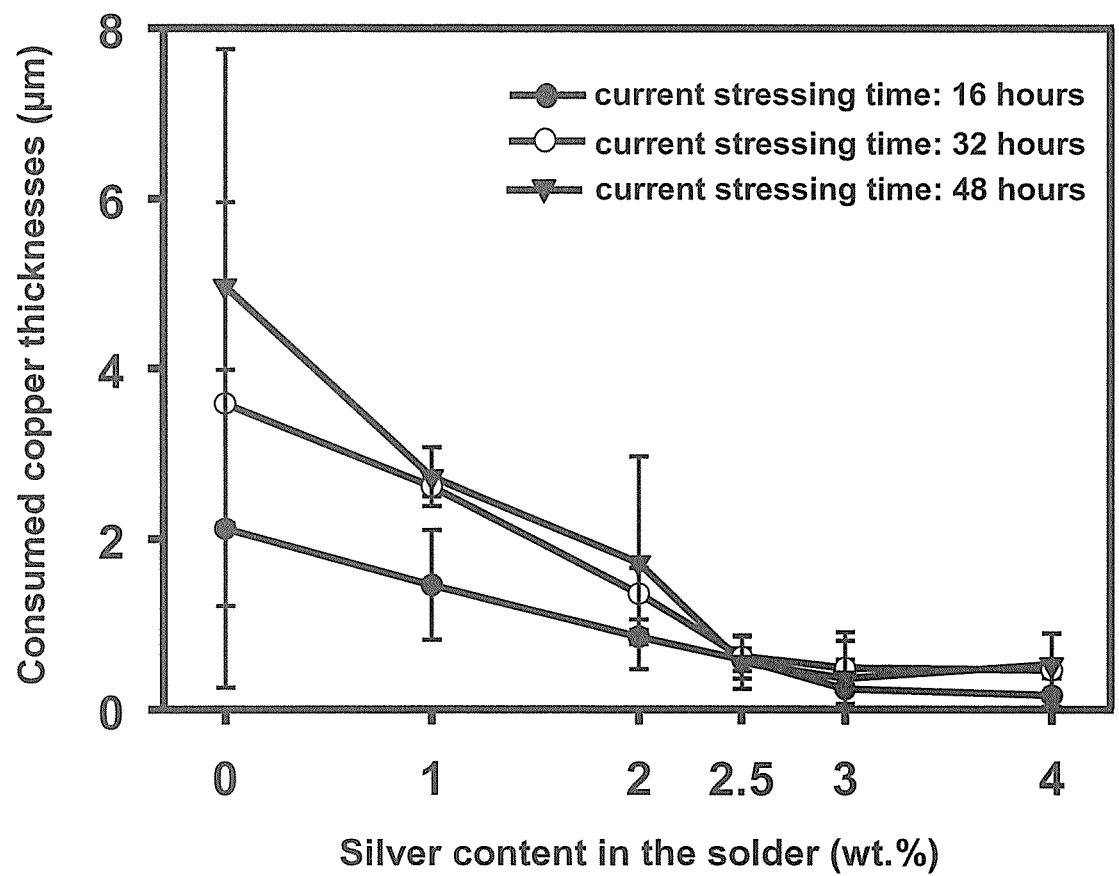
FIG. 4 shows the relationship between the silver content in the solder and the consumed thicknesses of copper metallization pads after electron current stressing.

FIG. 4 shows the relationship between the silver content in the solder and the consumed thicknesses of copper metallization pads after electron current stressing. Referring to FIG. 4, the threshold value for reducing the consumed thickness of the copper metallization pads is 2.5 wt. % of the silver content in the solder. In other words, when the silver content in the solder is equal to or more than 2.5 wt. %, the electromigration-induced copper consumption can be inhibited effectively.

Figure 5:
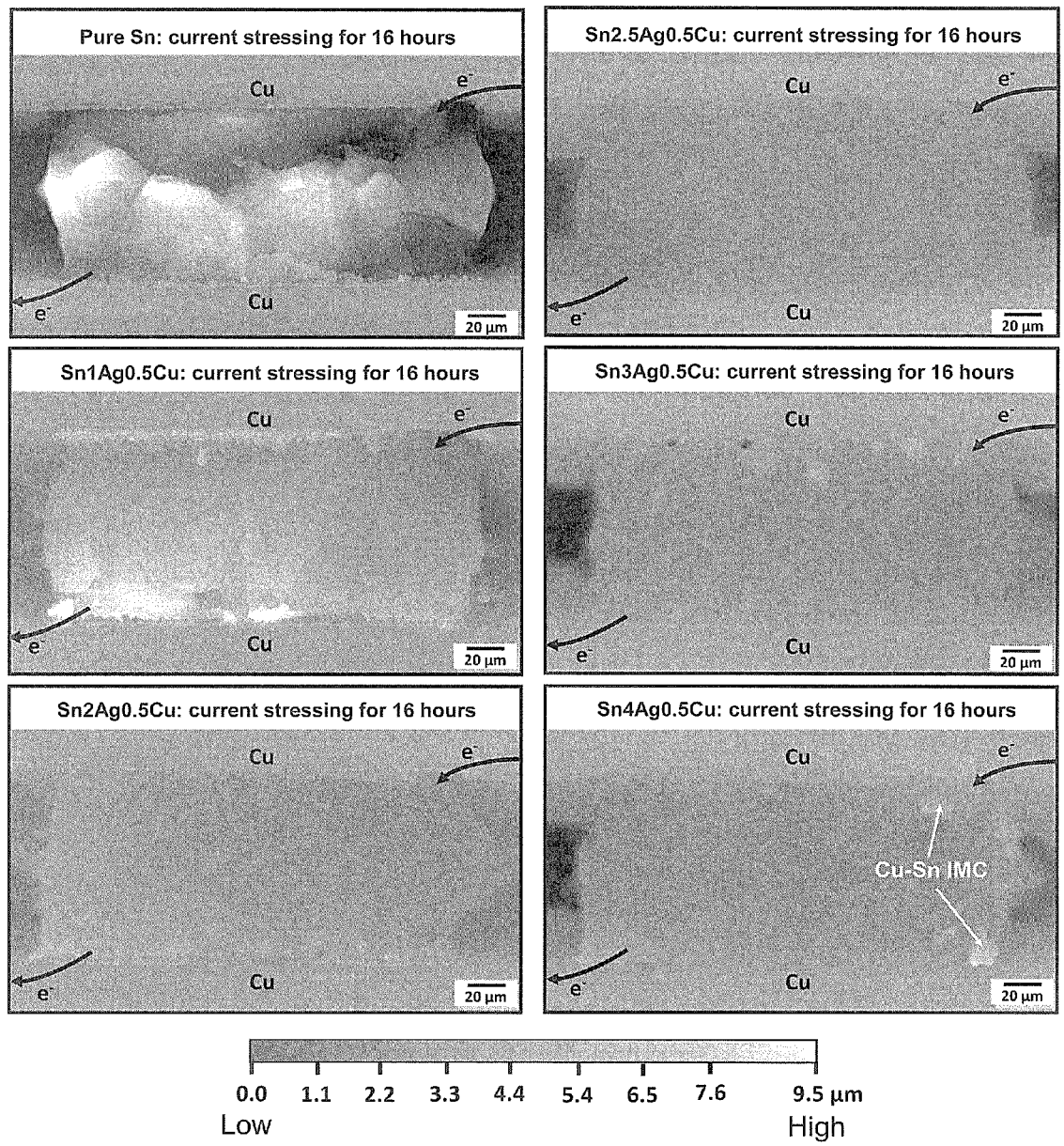
FIG. 5 shows confocal laser scanning microscopies (CLSM) showing the surface profiles of the solder regions after electron current stressing for 16 hours.

Additionally, for the solder with a silver content of equal to or more than 2.5 wt. %, the electromigration-induced solder deformations can also be effectively prevented. FIG. 5 shows confocal laser scanning microscopies (CLSM) illustrating the surface profiles of the solder regions after electron current stressing for 16 hours. Herein, an average current density of the solder joints is 8500 A/cm$^2$. In this figure, the grayscales represent various height differences, and light and dark shades represent hillocks and valleys/voids generated in the solder region, respectively. As depicted in FIG. 5, the solder with a silver content of less than 2.5 wt. % has a significant deformation after stressing for 16 hours. In contrast, no remarkable solder deformation is created after stressing for 16 hours when the silver content in the solder is equal to or more than 2.5 wt. %; that is, the high Ag-containing solder is rarely affected by electromigration. Only a portion of solder exhibits hillocks due to the growth of a copper-tin IMC. Accordingly, after the copper metallization pads are joined to the solder of the invention (i.e. the silver content is within the range of equal to or more than 2.5 wt. % and less than 3.2 wt. %), electromigration-induced deformations in the solder can be significantly reduced and the undesired Ag$_3$Sn plates are not formed in the solder. Since the silver content in the solder can be decreased to less than 3.2 wt. %, the cost of materials can be controlled in the soldering process. In terms of the cost effectiveness, the silver content of 2.5 wt. % is more favorable.

In summary, when the solder of the invention (i.e. the silver content is within the range of equal to or more than 2.5 wt. % and less than 3.2 wt. %) is employed to join metallization pads, the following advantages can be achieved. Upon electron current stressing, the solder deformations can be avoided effectively and the consumption of the metallization pads induced by electromigration can be prevented. Further, since the silver content in the solder is less than 3.2 wt. % in the invention, the undesired Ag$_3$Sn plates are prevented from forming in the solder matrix, and the cost of the solder alloy can be reduced. Consequently, the invention is capable of preventing the metallization pad from being greatly consumed, avoiding the deformations of the solder, preventing the formation of the Ag$_3$Sn plates, and reducing the manufacturing cost.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A method for controlling beta-tin crystal orientation in a solder joint, suitable for joining a metallization pad with a solder alloy containing tin, silver and copper, wherein by adjusting the silver content in the solder alloy to be equal to 2.5 wt. %, the axes [001] of beta-tin crystals in the solder are to be aligned in the direction parallel with a solder/metallization pad interface substantially, and the formation of Ag3Sn plates in the solder is prevented, and wherein the copper content in the solder alloy is fixed at 0.5 wt. %.

2. The method for controlling the beta-tin crystal orientation in a solder joint as claimed in claim 1, wherein a material of the metallization pad comprises a copper-based alloy or a nickel-based alloy.

* * * * *